(12) United States Patent
Dalmia et al.

(10) Patent No.: US 9,070,509 B2
(45) Date of Patent: Jun. 30, 2015

(54) METHOD FOR MANUFACTURING A PLANAR ELECTRONIC DEVICE HAVING A MAGNETIC COMPONENT

(75) Inventors: Sidharth Dalmia, Friar Oaks, CA (US); Spencer Viray, Sacramento, CA (US); Lee Harrison, El Dorado Hills, CA (US); Jess Kerlin, Davis, CA (US); Khanh Nguyen, Davis, CA (US); Steven R. Kubes, El Dorado Hills, CA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 1139 days.

(21) Appl. No.: 13/028,949

(22) Filed: Feb. 16, 2011

(65) Prior Publication Data

US 2011/0272094 A1 Nov. 10, 2011

Related U.S. Application Data

(63) Continuation-in-part of application No. 12/592,771, filed on Dec. 1, 2009, now Pat. No. 8,203,418, which is (Continued)

(51) Int. Cl.
*H01F 41/04* (2006.01)
*H01F 17/04* (2006.01)

(Continued)

(52) U.S. Cl.
CPC .......... *H01F 41/041* (2013.01); *H01F 41/042* (2013.01); *H01F 41/0253* (2013.01);

(Continued)

(58) Field of Classification Search
CPC .......... H01F 17/0033; H01F 2017/048; H01F 41/041; H01F 41/042; H01F 41/046; H01F 41/0253; B29C 39/10; C08G 59/621; C08L 63/00; Y10T 29/4902; Y10T 29/49073; Y10T 29/49069; Y10T 29/49075; Y10T 29/49078

USPC .......... 29/602.1, 604, 606, 607, 609; 528/408; 525/108; 336/200, 208, 221; 264/272.13, 272.19
See application file for complete search history.

(56) References Cited

U.S. PATENT DOCUMENTS 3,881,244 A 5/1975 Kendall
3,914,334 A * 10/1975 Lubowitz et al. .............. 525/108

(Continued)

FOREIGN PATENT DOCUMENTS

JP 01171219 A * 7/1989 ............... 29/602.1 X
WO WO 2006/063081 6/2006

(Continued)

OTHER PUBLICATIONS

Shocking Technologies, www.shockingtechnologies.com, Voltage Switchable dielectric Materials Integration, pp. 1-5, Mar. 2011.

*Primary Examiner* — A. Dexter Tugbang (57) ABSTRACT

A method for manufacturing a planar electronic device includes applying a non-conductive fluid polymer to a lower side of a planar substrate. The substrate includes a hole extending through the substrate. The method also includes curing the fluid polymer to form a solid centering layer on the lower side of the substrate, with the centering layer extending across the hole along the lower side of the substrate. The method further includes loading a ferrite material body into the hole of the substrate through the upper side of the substrate, embedding the ferrite material body in an encapsulating material in the hole, and forming one or more conductive loops around the ferrite material body. The ferrite material body is held within the substrate between the lower side and the upper side of the substrate by the encapsulating material.

19 Claims, 9 Drawing Sheets

Related U.S. Application Data a continuation-in-part of application No. 12/006,822, filed on Jan. 4, 2008, now Pat. No. 7,821,374.

(60) Provisional application No. 61/343,967, filed on May 5, 2010, provisional application No. 60/880,208, filed on Jan. 11, 2007, provisional application No. 61/200,809, filed on Dec. 3, 2008, provisional application No. 61/204,178, filed on Dec. 31, 2008.

(51) Int. Cl.
| | |
|---|---|
| *H01F 41/02* | (2006.01) |
| *B29C 39/10* | (2006.01) |
| *H01F 17/00* | (2006.01) |
| *C08G 59/62* | (2006.01) |
| *C08L 63/00* | (2006.01) |

(52) U.S. Cl.
CPC ............... *C08G59/621* (2013.01); *C08L 63/00* (2013.01); *Y10T 29/4902* (2015.01); *Y10T 29/49073* (2015.01); *Y10T 29/49069* (2015.01); *Y10T 29/49075* (2015.01); *Y10T 29/49078* (2015.01); *B29C 39/10* (2013.01); *H01F 17/0033* (2013.01); *H01F 41/046* (2013.01); *H01F 2017/048* (2013.01)

(56) References Cited

U.S. PATENT DOCUMENTS

| | | | |
|---|---|---|---|
| 5,055,816 | A | 10/1991 | Altman et al. |
| 5,191,699 | A | 3/1993 | Ganslmeier et al. |
| 6,148,500 | A | 11/2000 | Krone et al. |
| 7,158,005 | B2 | 1/2007 | Pleskach et al. |
| 7,271,697 | B2 | 9/2007 | Whittaker et al. |
| 7,671,716 | B2 | 3/2010 | Chen |
| 7,821,374 | B2 | 10/2010 | Harrison et al. |
| 2004/0147715 | A1* | 7/2004 | Ishii et al. .............. 528/408 |
| 2004/0212475 | A1 | 10/2004 | Schumacher |
| 2009/0002111 | A1 | 1/2009 | Harrison et al. |
| 2010/0295646 | A1 | 11/2010 | Harrison et al. |
| 2011/0108317 | A1 | 5/2011 | Harrison et al. |

FOREIGN PATENT DOCUMENTS

| | | |
|---|---|---|
| WO | WO2006/063081 | 6/2006 |
| WO | WO 2008/088682 | 7/2008 |
| WO | WO2010/065113 | 6/2010 |

* cited by examiner

METHOD FOR MANUFACTURING A PLANAR ELECTRONIC DEVICE HAVING A MAGNETIC COMPONENT

CROSS-REFERENCE TO RELATED APPLICATIONS

This application claims priority benefit to U.S. Provisional Application No. 61/343,967, which is entitled "Manufacturing Of Embedded Components Using Integrated Ferrites In Laminate Materials" and was filed on May 5, 2010 (the "'967 application"). This application also is related to PCT International Application No. PCT/US2009/006346, which is entitled "An Integrated Planar Variable Transformer With Embedded Magnetic Core" and was filed on Dec. 1, 2009 (the "'346 application"). The subject matter disclosed in each of the '967 application and the '346 application is incorporated by reference herein in its entirety. This application also claims priority benefit as a continuation-in-part application of U.S. Nonprovisional application Ser. No. 12/592,771, which is entitled "Manufacture And Use Of Planar Embedded Magnetics As Discrete Components And In Integrated Connectors" and was filed on Dec. 1, 2009 (the "'771 application"). The '771 application is a continuation-in-part and claims the benefit of U.S. Nonprovisional application Ser. No. 12/006,822, now U.S. Pat. No. 7,821,374, which is entitled "Wideband Planar Transformer" and was filed on Jan. 4, 2008 (the "'822 application"). The '771 application and the '346 application also claim priority to U.S. Provisional Application No. 61/200,809, which is entitled "Use Of Planar Magnetics in Integrated Connector" and was filed on Dec. 3, 2008 (the "'809 application"), and to U.S. Provisional Application No. 61/204,178, which is entitled "Embedded Magnetic Edge Substrate Modules For Communication And Power" and was filed on. Dec. 31, 2008 (the "'178 application"). The '822 application claims priority benefit to U.S. Provisional Application No. 60/880,208, which is entitled "Wideband Planar Transformer" and was filed on Jan. 11, 2007, and is related to PCT International Application No. PCT/US2008/000154, which is entitled "Wideband Planar Transformer" and was filed on Jan. 4, 2008 (the "'154 application").

BACKGROUND OF THE INVENTION

The subject matter herein relates generally to electronic devices, such as transformers, inductors, bluns, couplers, or filters.

Some known electronic devices include planar bodies, such as circuit boards, that include one or more magnetic components built into the planar bodies. The magnetic component can include a ferrite core with conductive winding extending around the ferrite core. Some of these magnetic components include two conductive windings that are not conductively coupled with each other. For example, the conductive windings may not be physically or mechanically coupled such that electric current cannot flow through one conductive winding directly onto the other conductive winding. The current flowing through one winding generates a magnetic field in the core and in the other winding. The magnetic field in the other winding generates an electric current in the other winding. The electronic performance of the device can be determined by a variety of parameters, such as the ratio of the number of turns in the first winding to the number of turns in the second winding, the shape of the first and/or second windings, the impedance of the first and second windings, and the like.

The manufacturing process of some known planar electronic devices having magnetic components includes depositing layers of thermoset materials, such as FR-4, on a substrate that includes the ferrite core. The thermoset layers may be planarized before depositing additional conductive layers or bodies that form the conductive loops around the ferrite core. The planarizing of the thermoset layers may include sanding or otherwise removing rough or undulating portions of the thermoset layers. Some known manufacturing processes can damage the ferrite core in several magnetic components in a substrate due to relatively large variability in the vertical positions of the ferrite cores. For example, some of the ferrite cores may not be fully within the thickness of the substrate and thus may project from one of the sides of the substrate. The projecting portions of the ferrite cores can be mechanically damaged by the planarization of the thermoset layers. Damage to the ferrite cores can result in relatively large variations in the electric impedance characteristics of the magnetic components in a substrate. Additionally, mechanical stress may be imparted on the ferrite core and/or the electronic performance of the electronic device may be reduced if the ferrite core is asymmetrically located or placed within the substrate.

A need exists for a planar electronic device having a magnetic component and a method for manufacturing such a device that avoids damaging the ferrite cores of the devices.

SUMMARY OF THE INVENTION

In one embodiment, a method for manufacturing a planar electronic device includes applying a non-conductive fluid polymer to a lower side of a planar substrate. The substrate includes a hole extending through the substrate. The method also includes curing the fluid polymer to form a solid centering layer on the lower side of the substrate, with the centering layer extending across the hole along the lower side of the substrate. The method further includes loading a ferrite material body into the hole of the substrate through the upper side of the substrate, embedding the ferrite material body in an encapsulating material in the hole, and forming one or more conductive loops around the ferrite material body. The ferrite material body is held within the substrate between the lower side and the upper side of the substrate by the encapsulating material.

In another embodiment, another method for manufacturing a planar electronic device is provided. The method includes applying a fluid non-conductive polymer to a fiber sheet and positioning the fluid polymer and the fiber sheet on a lower side of a planar substrate. The substrate includes a hole extending through the substrate between the lower side and an opposite upper side of the substrate. The method also includes curing the fluid polymer to form a fiber-reinforced centering layer on the lower side of the substrate, with the centering layer extending along the lower side of the substrate and across the hole through the substrate. The method further includes inserting a ferrite material body into the hole of the substrate through the upper side of the substrate. The centering layer prevents the ferrite material body from moving out of the hole through the lower side of the substrate. The method also includes forming one or more conductive loops around the ferrite material body. The ferrite material body is held within the substrate between the lower side and the upper side of the substrate by the centering layer.

In another embodiment, another method for manufacturing a planar electronic device is provided. The method includes applying a non-conductive fluid polymer to a lower side of a planar substrate. The substrate includes a hole extending through the substrate and having a diameter dimension that is smaller at the lower side of the substrate than at an opposite upper side of the substrate. The method also includes curing the fluid polymer to form a solid centering layer on the lower side of the substrate, where the centering layer extends along the lower side of the substrate and across the hole through the substrate. The method further includes loading a ferrite material body into the hole of the substrate through the upper side of the substrate. The centering layer prevents the ferrite material body from moving out of the hole through the lower side of the substrate. The method also includes forming one or more conductive loops around the ferrite material body. The ferrite material body is held within the substrate between the lower side and the upper side of the substrate by at least one of the centering layer or the smaller diameter dimension of the hole at the lower side of the substrate.

DETAILED DESCRIPTION OF THE DRAWINGS

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

One or more embodiments described herein provide planar electronic devices that include magnetic components, such as planar transformers, in which ferrite material bodies (e.g., ferrites or magnets) are embedded as a component into a planar dielectric substrate having holes extending therethrough. The ferrite material bodies are encapsulated in a low-stress adhesive, such as a low-stress epoxy, disposed to provide a proper electrical environment. In a cured state, the epoxy can be near solid, flexible, and/or elastic in nature. The elasticity and/or flexibility of the cured epoxy can vary on the curing agents used and/or the composition of the epoxy. One or more layers of a conductive material (e.g., copper) disposed on the substrate and conductive vias extending through the substrate provide a magnetic component, such as a transformer.

In one embodiment, a centering layer extends along one side of the substrate and across the holes. The centering layer can locate the ferrite material bodies within the holes in the substrate such that the ferrite material bodies are located within the thickness of the substrate and do not protrude from a lower side of the substrate. The centering layer also can locate the ferrite material bodies such that the bodies are received far enough into the holes such that the ferrite material bodies do not protrude from an upper side of the substrate. The centering layer assists in locating the ferrite material bodies within the thickness of the substrate so that the ferrite material bodies are embedded in an encapsulating material, such as a low-stress adhesive, within the substrate. Subsequent deposition of additional layers of thermoset polymers (e.g., prepreg), conductive materials (e.g., copper layers), and the like, onto the substrate, followed by planarization of the additional layers, does not damage the ferrite material bodies as the bodies are held within the thickness of the substrate and do not protrude from either side of the substrate. The thickness of the centering layer below substrate can be precisely controlled using coating machines in the presence of a vacuum to eliminate or reduced air bubbles in the centering layer. A thickness for the centering layer can be 5 to 200 micrometers in one embodiment, although other thicknesses may be used. The thickness of the centering layer may depend on the strength and/or shape of the ferrite material bodies.

Figure 1:
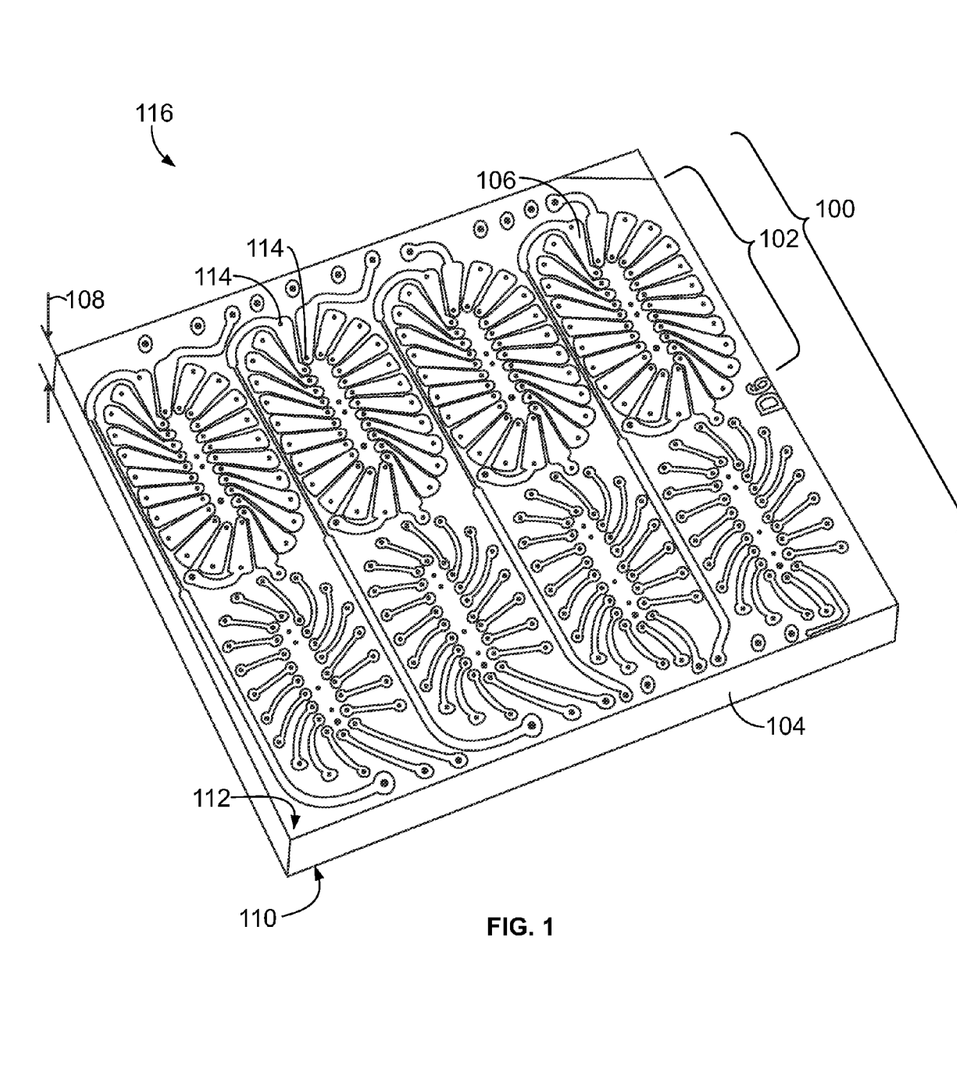
FIG. 1 is a perspective view of one embodiment of a planar electronic device having an array of magnetic components.

FIG. 1 is a perspective view of one embodiment of a planar electronic device 116 having an array 100 of magnetic components 102. The magnetic components 102 shown in FIG. 1 are transformer devices. Alternatively, the magnetic components 102 may be or include another electronic device or component, such as an inductor, filter, blun, coupler, and the like, that include a ferrite body or other magnetic material. The magnetic components 102 are disposed in a planar dielectric or non-conductive substrate 104. The illustrated magnetic components 102 have an oval shape, but alternatively may have a different shape, such as a circular shape.

The substrate 104 has a thickness dimension 108 that is measured between a lower side 110 and an opposite upper side 112 of the substrate 104. As used herein, the terms "lower" and "upper" are used to refer to the opposite sides of the substrate 104. The use of the terms "lower" and "upper" are not meant to limit or require a single, specific orientation of the substrate 104. For example, the substrate 104 may be flipped over such that the upper side 112 is below the lower side 110.

For each magnetic component 102, several top conductors 106 are disposed on the upper side 112 of the substrate 104, and several bottom conductors 314 (shown in FIG. 3) are disposed on the lower side 110 of the substrate 104. The bottom conductors 314 may be the same size and/or shape as the top conductors 106. The substrate 104 includes vias 114 that extend through the substrate 104 from the upper side 112 of the substrate 104 to the lower side 110 of the substrate 104. The vias 114 are filled or plated with a conductive material to provide conductive pathways through the substrate 104. Opposite ends of each via 114 are conductively coupled with the top conductors 106 and the bottom conductors 314 on the substrate 104. The vias 114, top conductors 106, and bottom conductors 314 form looping or winding conductive pathways that wrap around a ferrite material body 200 (shown in FIG. 2) that is disposed within the substrate 104.

Figure 2:
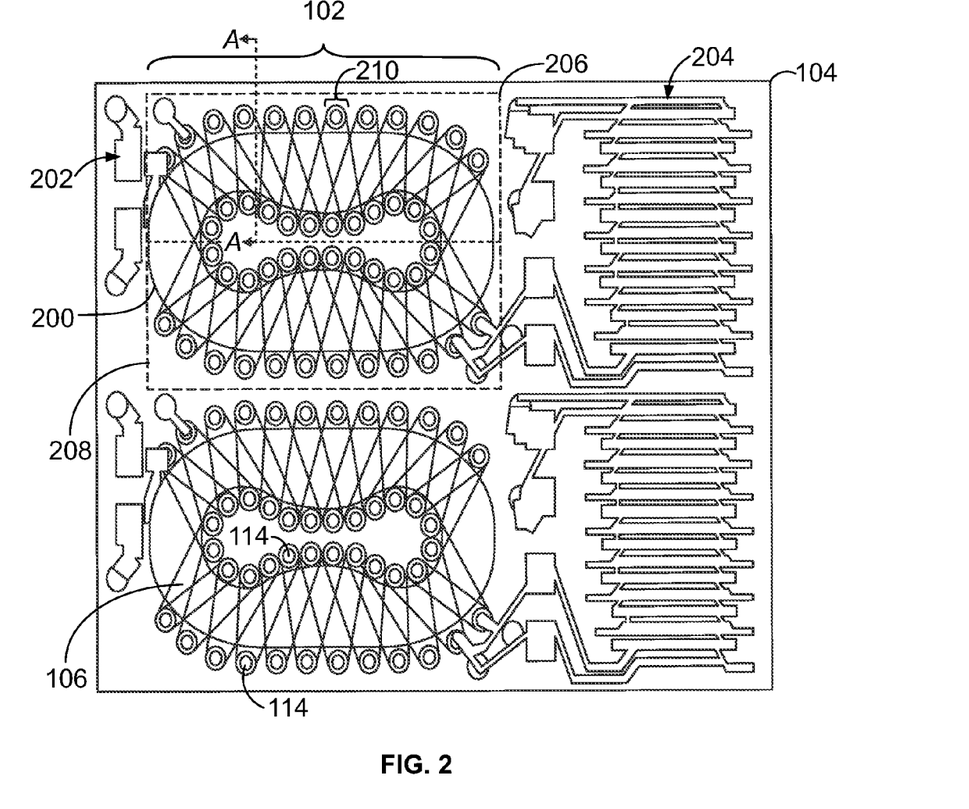
FIG. 2 is a top view of magnetic components of the electronic device shown in FIG. 1.

FIG. 2 is a top view of two magnetic components 102 shown in FIG. 1. The substrate 104 and top conductors 106 are shown in phantom view in FIG. 2 so that the location of the ferrite material bodies 200 in the magnetic components 102 may be more easily seen. For each magnetic component 102, the top conductors 106 are conductively coupled with the vias 114 at opposite ends of the top conductors 106. As described above, the vias 114 include conductive material and are conductively coupled with the bottom conductors 314 (shown in FIG. 3) disposed on the lower side 110 (shown in FIG. 1) of the substrate 104. The top conductors 106, vias 114, and bottom conductors 314 form conductive pathways that loop or wrap around the ferrite material body 200 in the substrate 104 multiple times.

The conductive pathways formed by the top conductors 106, vias 114, and bottom conductors 314 (shown in FIG. 3) may be referred to as first and second conductive loops 206, 208 that extend around the ferrite material body 200. Each of the reference numbers 206, 208 in FIG. 2 point to dashed boxes that encircle a different conductive loop of the same magnetic component 102. Each conductive loop 206, 208 includes several turns 210 around the ferrite material body 200. The combination of the conductive loops 206, 208 and the ferrite material body 200 form the magnetic component 102. The conductive loops 206, 208 that wrap around the same ferrite material body 200 may not be conductively coupled with each other. In one embodiment, the first conductive loop 206 of the magnetic component 102 may receive electric power from a first circuit 202. The second conductive loop 208 of the same magnetic component 102 may be conductively coupled with a second circuit 204.

The first and second conductive loops 206, 208 can be inductively coupled with each other by the ferrite material body 200 such that electric current passing through the first conductive loop 206 is inductively transferred to the second conductive loop 208. For example, a varying electric current passing through the first conductive loop 206 can create a varying magnetic flux in the ferrite material body 200. The varying magnetic flux generates a varying magnetic field in the second conductive loop 208. The varying magnetic field induces a varying electromotive force, or voltage, in the second conductive loop 208. The second conductive loop 208 transfers the induced voltage to the second circuit 204.

Figure 3:
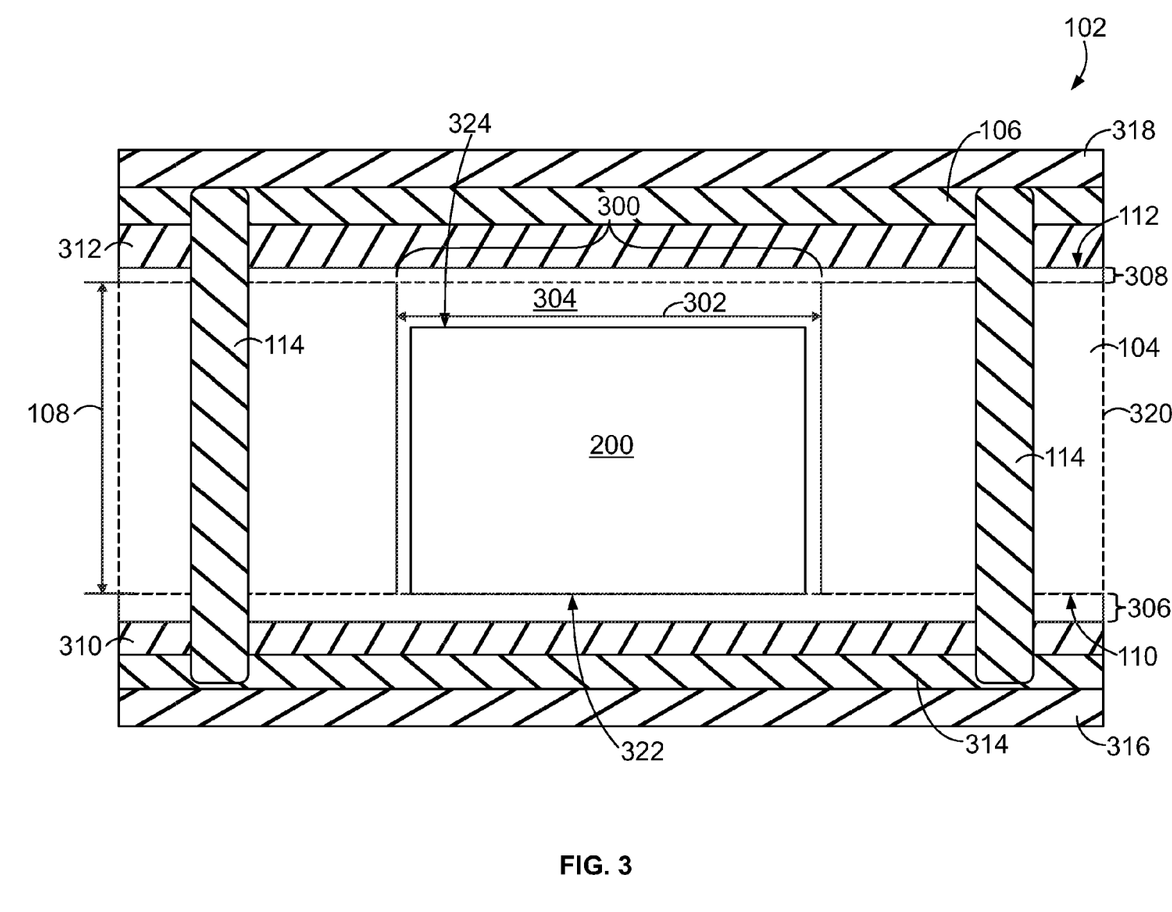
FIG. 3 is a cross-sectional view of the magnetic component along line A-A shown in FIG. 2.

FIG. 3 is a cross-sectional view of the magnetic component 102 along line A-A shown in FIG. 2. The magnetic component 102 is a laminate structure having several layers disposed on top of each other. The core of the magnetic component 102 is provided by the substrate 104. The substrate 104 can include or be formed from a dielectric material, such as a glass-filed epoxy (e.g., FR-4) suitable for a printed circuit board (PCB), a thermoset material, or a thermoplastic material. Alternatively, another rigid or semi-rigid material may be used for the substrate 104.

The upper and lower sides 112, 110 of the substrate 104 define outer boundaries of an envelope 320 of the substrate 104. For example, the envelope 320 of the substrate 104 may extend from a lower plane that is defined by, and coextensive with, the lower side 110 of the substrate 104 to an upper plane that is defined by, and coextensive with, the upper side 112 of the substrate 104. The envelope 320 can represent the volume of the substrate 104 in which the ferrite material body 200 is located.

A hole 300 extends through the substrate 104 and provides an opening in the substrate 104 in which the ferrite material body 200 is disposed. In the illustrated embodiment, the hole 300 has an approximately constant diameter dimension 302 throughout the thickness dimension 108 of the substrate 104. For example, the inside diameter of the hole 300 may be the same (or within 1%, 5%, 10%, or another manufacturing tolerance) at the upper side 112 of the substrate 104, the lower side 110 of the substrate 104, and at other locations between the upper side 112 and the lower side 110 of the substrate 104. Alternatively, the diameter dimension 302 of the hole 300 may be different or significantly vary (e.g., change by more than 1%, 5%, 10%, or another manufacturing tolerance) at various locations inside the substrate 104 between the lower side 110 and the upper side 112 of the substrate 104.

The ferrite material body 200 is located within the hole 300. The ferrite material body 200 is held within the hole 300 such that the ferrite material body 200 does not extend beyond the envelope 320 of the substrate 104. For example, with respect to the view shown in FIG. 3, the ferrite material body 200 vertically extends from a lower surface 322 to an upper surface 324. In one embodiment, the ferrite material body 200 is located within the hole 300 of the substrate 104 such that no part of the ferrite material body 200 extends beyond or protrudes from the envelope 320 of the substrate 104. For example, the lower surface 322 of the ferrite material body 200 may not extend beyond the plane defined by the lower side 110 of the substrate 104. As shown in FIG. 3, the lower surface 322 of the ferrite material body 200 can be coextensive with the plane defined by the lower side 110 of the substrate 104. Alternatively, the ferrite material body 200 may be located above the plane defined by the lower side 110 of the substrate 104 such that the lower surface 322 of the ferrite material body 200 does not intersect the plane defined by the lower side 110. Also as shown in FIG. 3, the upper surface 324 of the ferrite material body 200 may not extend beyond or intersect the plane defined by the upper side 112 of the substrate 104.

The ferrite material body 200 may be embedded in an encapsulating material 304. The encapsulating material 304 is a non-conductive material that fills or substantially fills (e.g., fills 90%, 95%, or 98% or more of) the hole 300 in the substrate 104. In one embodiment, the encapsulating material 304 is a polymer, such as an epoxy. Alternatively, a different type of material may be used. As shown in FIG. 3, the encapsulating material 304 may also extend along the upper side 112 of the substrate 104 and/or along the lower side 110 of the substrate 104. The portion of the encapsulating material 304 that is disposed outside of the substrate 104 and that extends along the lower side 110 of the substrate 104 may be referred to as a lower centering layer 306. The portion of the encapsulating material 304 that is disposed outside of the substrate 104 and that extends along the upper side 112 of the substrate 104 may be referred to as an upper centering layer 308. As described below, the lower centering layer 306 may be applied or deposited onto the lower side 110 of the substrate 104 prior to loading the encapsulating material 304 into the hole 300 in the substrate 104.

The lower centering layer 306, the encapsulating material 304, and/or the upper centering layer 308 assist in positioning the ferrite material body 200 within the thickness dimension 108 of the substrate 104. For example, the lower centering layer 306 can prevent the ferrite material body 200 from projecting out of the substrate 104 beyond the lower side 110 of the substrate 104. As described below, the lower centering layer 306 can be formed prior to inserting the ferrite material body 200 into the hole 300 such that the ferrite material body 200 cannot pass through and be removed from the hole 300 through the lower side 110 of the substrate 104. The encapsulating material 304 and/or the upper centering layer 308 can prevent the ferrite material body 200 from projecting out of the substrate 104 beyond the upper side 112 of the substrate 104. Also as described below, the encapsulating material 304 and the upper centering layer 308 can be formed around the ferrite material body 200 after the ferrite material body 200 is held in the hole 300 by the lower centering layer 306. The encapsulating material 304 and/or the upper centering layer 308 can then prevent removal of the ferrite material body 200 out of the hole 300 through the upper side 112 of the substrate 104.

Lower and upper adhesive layers 310, 312 are disposed outside of the lower and upper centering layers 306, 308. The lower adhesive layer 310 can be deposited onto the lower centering layer 306 and the upper adhesive layer 312 can be deposited onto the upper centering layer 308. The adhesive layers 310, 312 include, or are formed from, non-conductive materials, such as polymers. For example, the adhesive layers 310, 312 may be formed by depositing an epoxy, a low stress epoxy, a thermoplastic, a high temperature thermoplastic, or a high lateral flow ceramic filled hydrocarbon material. Alternatively, a different material may be used. The adhesive layers 310, 312 may be cured to provide mechanical stability to the magnetic component 102. For example, the adhesive layers 310, 312 may be cured and become rigid bodies that laterally support the magnetic component 102.

The top conductors 106 are secured to the upper adhesive layer 312 and the bottom conductors 314 are secured to the lower adhesive layer 310. The top and bottom conductors 106, 314 may be secured to the adhesive layers 312, 310 by depositing conductive layers (e.g., metal or metal alloy layers) onto the adhesive layers 312, 310. In one embodiment, the conductors 106, 314 are formed by selectively depositing copper or a copper alloy onto the adhesive layers 312, 310. One or more additional conductive or metal layers can be added by laminating additional upper and/or lower adhesive layers 310, 312 on or outside of the top and/or bottom conductors 106, 314 and then depositing additional conductive layers (such as additional top and/or bottom conductors 106, 314) on the additional adhesive layers.

As shown in FIG. 3, the vias 114 vertically extend through the substrate 104. For example, the vias 114 extend from the top conductor 106 to the bottom conductor 314 and pass throughout the entire thickness dimension 108 of the substrate 108. The vias 114 are filled with a conductive material, such as a metal or metal alloy, in the illustrated embodiment. Alternatively, the interior surfaces of the vias 114 may be plated with a conductive material. As described above, the vias 114 provide a conductive pathway that conductively couples the top and bottom conductors 106, 314. As shown in the cross-sectional view of FIG. 3, the top conductor 106, the bottom conductor 314, and the vias 114 form a single turn 210 (shown in FIG. 2) that encircles or extends around the ferrite material body 200.

Lower and upper mask layers 316, 318 can be provided outside of the bottom and top conductors 314, 106. In one embodiment, the mask layers 316, 318 are solder mask layers that prevent exposure of portions of the bottom and top conductors 314, 106 to deposition of solder. For example, the mask layers 316, 318 may be provided on portions of the bottom and top conductors 314, 106 to prevent solder from being deposited on those portions. Alternatively, the mask layers 316, 318 may not be included in the magnetic component 102.

Figure 4:
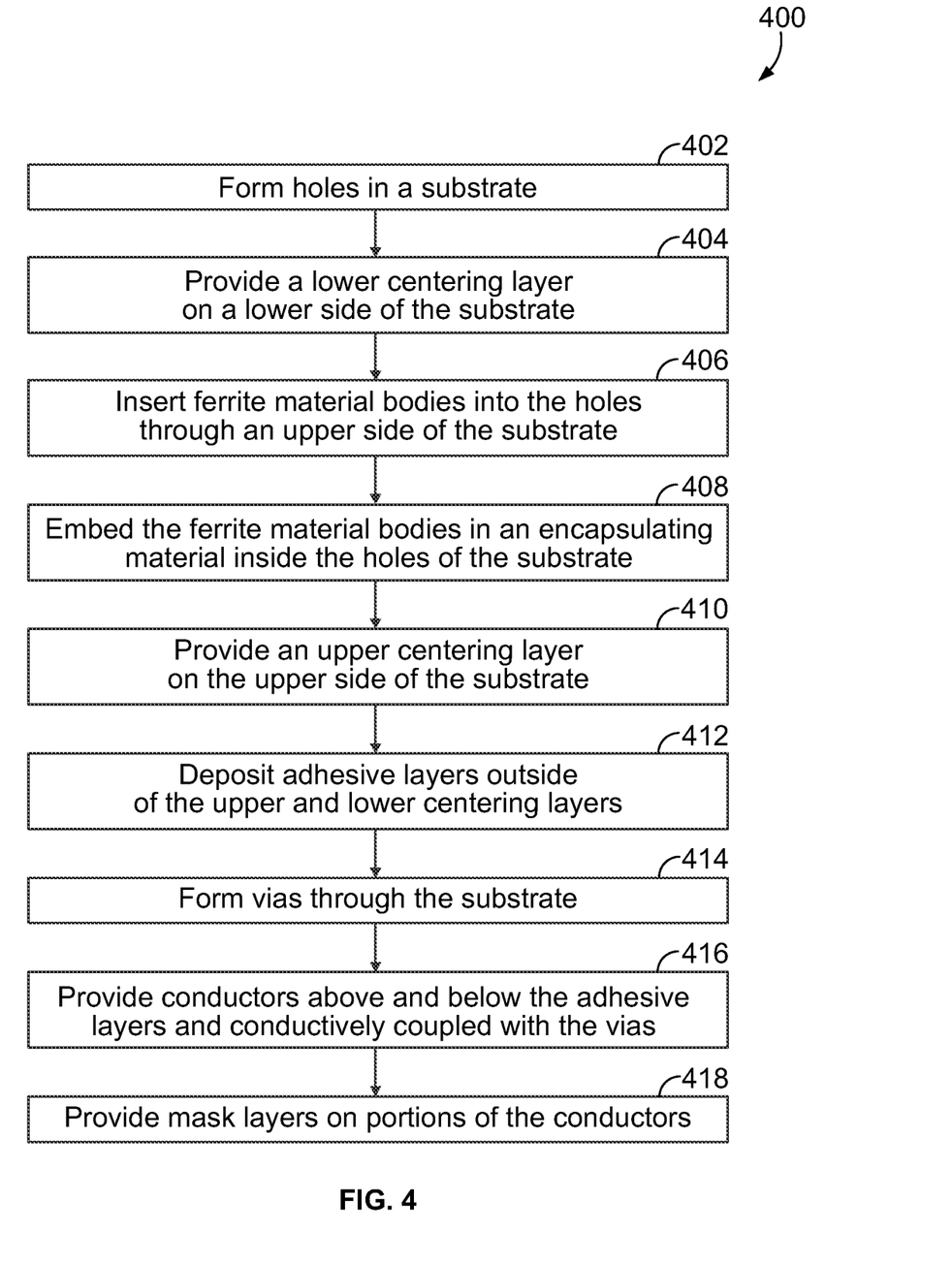
FIG. 4 is a flowchart of one embodiment of a method for manufacturing a planar electronic device having a magnetic component.

FIG. 4 is a flowchart of one embodiment of a method 400 for manufacturing a planar electronic device having a magnetic component. The method 400 may be used to manufacture the electronic device 116 (shown in FIG. 1). The method 400 is described in conjunction with FIGS. 5 through 10, which illustrate the electronic device 116 at different stages of manufacture. FIGS. 5 through 10 are discussed below with continued reference back to the method 400 shown in FIG. 4.

At 402, holes are formed in a planar substrate. For example, one or more of the holes 300 (shown in FIG. 3) may be cut or drilled into the substrate 104 (shown in FIG. 1). Alternatively, the substrate 104 may be formed or molded with the holes 300 extending through the substrate 104. The holes are formed to be large enough to accept the ferrite material bodies that are later inserted into the holes.

Figure 5:
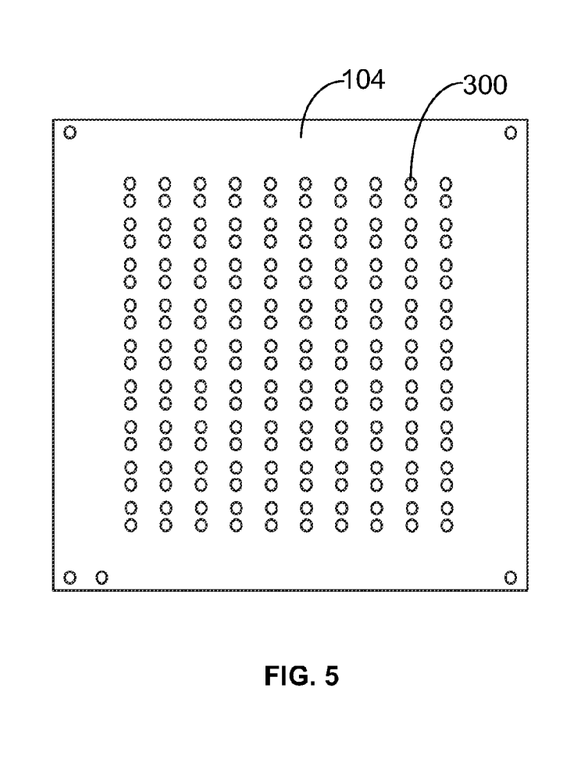
FIG. 5 is a top view of a substrate shown in FIG. 1 with several holes provided in the substrate.

FIG. 5 is a top view of the substrate 104 with several of the holes 300 provided in the substrate 104. As shown, the holes 300 may be arranged in a regular grid or array. While the holes 300 have circular shapes in the illustrated embodiment, alternatively, the holes 300 may have oval or polygon shapes. The holes 300 extend completely through the substrate 104. Alternatively, the holes 300 only partially extend into the substrate 104. For example, the holes 300 may extend into the substrate 104 from the upper side 112 (shown in FIG. 1) of the substrate 104 but not completely through the substrate 104 to the lower side 110 (shown in FIG. 1).

At 404 of the method 400 shown in FIG. 4, a lower centering layer is provided on a lower side of the substrate. For example, the lower centering layer 306 (shown in FIG. 3) may be deposited onto the lower side 110 (shown in FIG. 1) of the substrate 104 (shown in FIG. 1). In one embodiment, the lower centering layer 306 is provided by applying a fluid non-conductive polymer layer on the lower side 110 of the substrate 104 and curing the fluid polymer layer to form the solid lower centering layer 306. The fluid polymer layer can be applied to the lower side 110 of the substrate 104 using a transfer deposition process. In the transfer deposition process, the fluid polymer layer is deposited onto a surface that is separate from the substrate 104, such as a flat surface of another object or body. The substrate 104 is placed onto the fluid polymer layer on the surface such that the lower side 110 of the substrate 104 contacts the fluid polymer layer on the surface. The fluid polymer layer is then transferred to the lower side 110 of the substrate 104.

Figure 6:
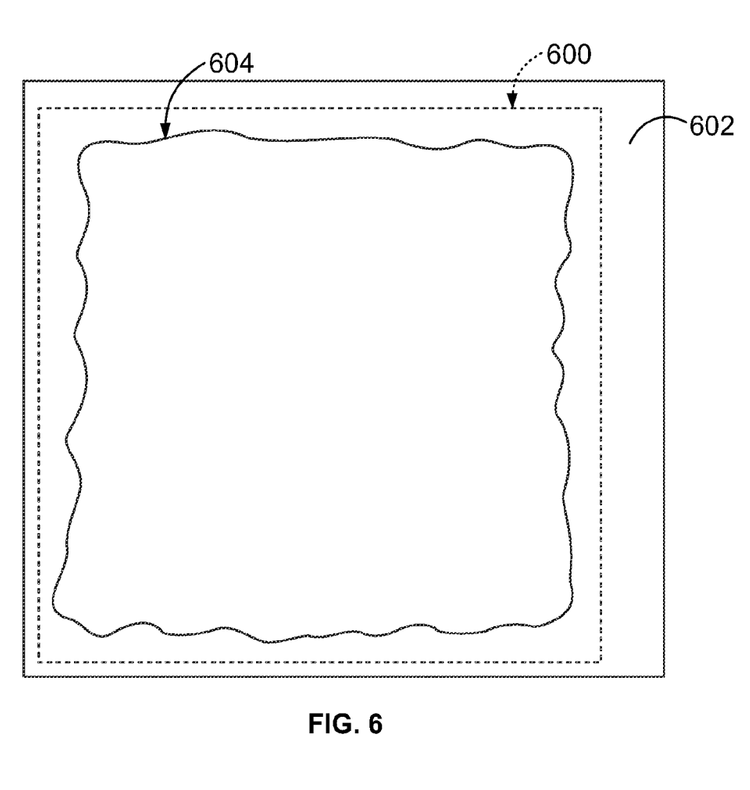
FIG. 6 is a top view of one embodiment of a transfer board with a supporting surface disposed on the transfer board.

FIG. 6 is a top view of one embodiment of a transfer board 600 with a supporting surface 602 disposed on the transfer board 600. The transfer board 600 is a solid block or board of polyethylene (PE) material in the illustrated embodiment. Alternatively, a different shape and/or material may be used as the transfer board 600. The supporting surface 602 is a polymer film that is positioned on the transfer board 600. For example, the supporting surface 602 may be a PE film that is affixed to the transfer board 600, such as by an adhesive. Alternatively, the supporting surface 602 may be formed from a different material and/or may be integral to the transfer board 600 (e.g., an upper surface of the transfer board 600).

A fluid base 604 of the non-conductive material from which the lower centering layer 306 (shown in FIG. 3) is formed is deposited or applied to the supporting surface 602. For example, liquid epoxy that includes or is mixed with a hardening agent may be deposited onto the supporting surface 602 such as by brushing, pouring, wiping, or otherwise placing the liquid epoxy onto the supporting surface 602. The amount or size of the fluid base 604 can vary based on the desired size and/or thickness of the lower centering layer 306.

The lateral size of the fluid base 604 is represented as the surface area of the supporting surface 602 over which the fluid base 604 extends. The lateral size of the fluid base 604 is at least as large as the surface area of the lower side 110 (shown in FIG. 1) of the substrate 104 (shown in FIG. 1) in the illustrated embodiment. Alternatively, the lateral size of the fluid base 604 may be smaller than the surface area of the lower side 110 of the substrate 104. For example, the lateral size of the fluid base 604 may be smaller so that the fluid base 604 is transferred to only a portion of the lower side 110 of the substrate 104. In one embodiment, the fluid base 604 includes 12 grams of a liquid mixture of epoxy and a hardening agent per square foot of the lateral size of the fluid base 604.

The substrate 104 (shown in FIG. 1) is placed onto the fluid base 604 such that the lower side 110 (shown in FIG. 1) of the substrate 104 contacts the fluid base 604. At least some of the fluid base 604 is transferred onto the lower side 110 of the substrate 104. In one embodiment, a mass or weight is placed on the upper side 112 (shown in FIG. 1) of the substrate 104 to provide a force on the substrate 104. For example, an object weighing at least 500 grams may be placed onto the substrate 104 to provide a force that maintains contact between the lower side 110 of the substrate 104 and the fluid base 604. The substrate 104 may be left on the fluid base 604 for a sufficiently long time to permit the fluid base 604 to cure and form the solid lower centering layer 306 (shown in FIG. 3). For example, the substrate 104 may be left on the fluid base 604 formed from liquid epoxy for at least 12 hours to permit the liquid epoxy to form a solid and flexible lower centering layer 306. Once the lower centering layer 306 is cured, the substrate 104 and the lower centering layer 306 may be removed from the supporting surface 602. In one embodiment, the lower centering layer 306 is a flexible and/or semi- or partially solid layer. Alternatively, the lower centering layer 306 may be a non-flexible or rigid layer.

In another embodiment, the fluid base 604 may be directly applied to the lower side 110 of the substrate 104. For example, instead of transferring the fluid base 604 from the supporting surface 602 to the lower side 110 of the substrate 104, the fluid base 604 may be brushed, poured, wiped, or otherwise placed onto the lower side 110 of the substrate 104. The fluid base 604 may remain on the lower side 110 of the substrate 104 until the fluid base 604 cures into the solid lower centering layer 306.

Alternatively, the lower centering layer 306 may be provided as a solid sheet or film that is coupled to the lower side 110 of the substrate 104. For example, the lower centering layer 306 may be a polymer film or sheet that is adhered to the lower side 110 of the substrate 104. The polymer film or sheet can be coupled to the lower side 110 of the substrate 104 without requiring the curing of the fluid base 604 to form the lower centering layer 306.

Figure 7:
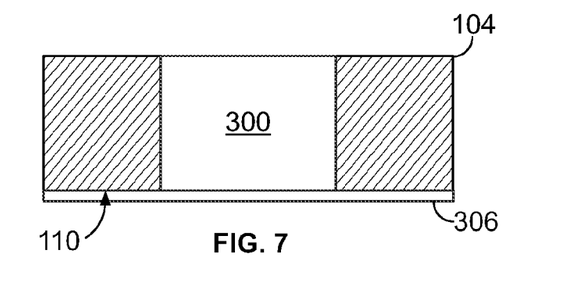
FIG. 7 is a cross-sectional view of one embodiment of the substrate shown in FIG. 1 after a lower centering layer shown in FIG. 3 is provided.

FIG. 7 is a cross-sectional view of one embodiment of the substrate 104 after the lower centering layer 306 is provided. As shown in FIG. 7, the lower centering layer 306 extends along the lower side 110 of the substrate 104. The lower centering layer 306 extends over or across the hole 300 at the lower side 110 of the substrate 104 such that the lower centering layer 306 closes the hole 300 at the lower side 110. The lower centering layer 306 provides a barrier to removing the ferrite material body 200 (shown in FIG. 2) from the hole 300 in the substrate 104 through the lower side 110 of the substrate 104.

Returning to the discussion of the method 400 shown in FIG. 4, at 406, ferrite material bodies are inserted into the holes of the substrate through the upper side of the substrate. For example, one or more ferrite material bodies 200 (shown in FIG. 2) may be loaded into one or more of the holes 300 (shown in FIG. 3) of the substrate 104 (shown in FIG. 1). The ferrite material bodies 200 are inserted into the holes 300 through the open ends of the holes 300 at the upper side 112 (shown in FIG. 1) of the substrate 104.

Figure 8:
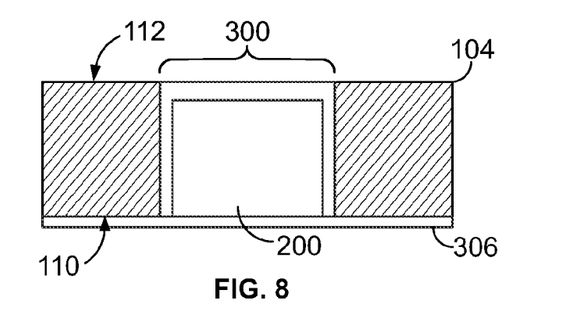
FIG. 8 is a cross-sectional view of one embodiment of the substrate shown in FIG. 1 after a ferrite material body is inserted into a hole in the substrate.

FIG. 8 is a cross-sectional view of one embodiment of the substrate 104 after the ferrite material body 200 is inserted into the hole 300 in the substrate 104. The ferrite material body 200 can be lowered into the hole 300 through the upper side 112 of the substrate 104. The lower centering layer 306 prevents the ferrite material body 200 from passing through the hole 300 and exiting the hole 300 through the lower side 110 of the substrate 104. For example, the ferrite material body 200 can be lowered into the hole 300 until the ferrite material body 200 contacts the lower centering layer 306.

In another embodiment, the ferrite material body 200 may be disposed in the hole 300 of the substrate 104 prior to providing the lower centering layer 306. For example, the substrate 104 may be pre-loaded with the ferrite material body 200 in the hole 300 prior to providing the lower centering layer 306 on the lower side 110 of the substrate 104. The holes 300 may be sufficiently small to hold the ferrite material body 200 inside the holes 300 while the fluid base 604 is transferred or applied to the lower side 110 of the substrate 104. The fluid base 604 may then cure to form the lower centering layer 306.

Returning to the discussion of the method 400 shown in FIG. 4, at 408, the ferrite material bodies in the holes of the substrate are embedded in an encapsulating material. For example, a fluid non-conductive material, such as epoxy or another polymer, may be loaded into the holes 300 (shown in FIG. 3) of the substrate 104 (shown in FIG. 1). The fluid non-conductive material may surround the ferrite material bodies 200 (shown in FIG. 2) in the holes 300, such as by filling the remaining volume in the holes 300 with the fluid non-conductive material. The fluid non-conductive material is then cured to form the solid non-conductive body of the encapsulating material 304 (shown in FIG. 3) around the ferrite material bodies 200.

At 410, an upper centering layer is provided on an upper side of the substrate. For example, the upper centering layer 308 (shown in FIG. 3) may be deposited onto the upper side 112 (shown in FIG. 1) of the substrate 104 (shown in FIG. 1). The upper centering layer 308 can be provided by applying a fluid non-conductive polymer layer on the upper side 112 of the substrate 104 and curing the fluid polymer layer to form the solid upper centering layer 308. In one embodiment, the upper centering layer 308 is formed at the same time that the encapsulating material 304 (shown in FIG. 3) is deposited around the ferrite material body 200 (shown in FIG. 2). For example, a fluid non-conductive polymer material may be deposited in the holes 300 and around the ferrite material bodies 200 as well as on the upper side 112 of the substrate 104 to form the encapsulating material 304 and the upper centering layer 308 at the same time.

Figure 9:
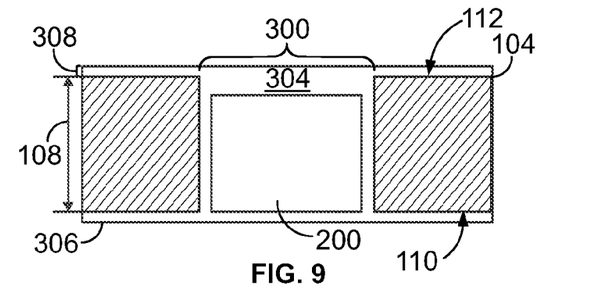
FIG. 9 is a cross-sectional view of one embodiment of the substrate shown in FIG. 1 after an encapsulating material and an upper centering layer are formed.

FIG. 9 is a cross-sectional view of one embodiment of the substrate 104 after the encapsulating material 304 and the upper centering layer 308 are formed. In one embodiment, the fluid polymer material used to form the encapsulating material 304 and the upper centering layer 308 is deposited onto the upper side 112 of the substrate 104 and inside the hole 300 in the substrate 104. The fluid polymer material is then cured to form the solid encapsulating material 304 and the upper centering layer 308. The fluid polymer material may be deposited by brushing, pouring, wiping, or otherwise placing the fluid polymer material onto the upper side 112 of the substrate 104 and into the hole 300 in the substrate 104. The fluid polymer material may bond with or otherwise couple with the lower centering layer 306 near the lower side 110 of the substrate 104 such that the lower centering layer 306, the encapsulating material 304, and the upper centering layer 308 form a single, continuous body formed from a common non-conductive material. One or more of the lower centering layer 306, the encapsulating material 304, and/or the upper centering layer 308 may bond with or otherwise couple with the substrate 104.

In another embodiment, the upper centering layer 308 is separately formed from the encapsulating material 304. For example, the fluid non-conductive material used to form the encapsulating material 304 may be deposited into the hole 300 around the ferrite material body 200 and allowed to cure. Then, the same or a different fluid non-conductive material may be deposited above the encapsulating material 304 and along the upper side 112 of the substrate and allowed to cure to form the upper centering layer 308. Alternatively, the upper centering layer 308 may be provided as a solid non-conductive sheet or film that is adhered or coupled to the upper side 112 of the substrate 104 after the encapsulating material 304 is cured around the ferrite material body 200. In another aspect, the upper centering layer 308 may not be provided.

As shown in FIG. 9, the lower centering layer 306, the encapsulating material 304, and/or the upper centering layer 308 locate the ferrite material body 200 within the thickness dimension 108 of the substrate 104 between the upper side 112 and the lower side 110 of the substrate 104. As described above, the lower centering layer 306 prevents the ferrite material body 200 from protruding beyond the lower side 110 of the substrate 104. The encapsulating material 304 and/or the upper centering layer 308 hold the ferrite material body 200 within the hole 300 such that the ferrite material body 200 cannot protrude beyond the upper side 112 of the substrate 104.

Returning to the discussion of the method 400 shown in FIG. 4, at 412, adhesive layers are deposited outside of the upper and lower centering layers. For example, the lower adhesive layer 310 (shown in FIG. 3) may be deposited onto the lower centering layer 306 (shown in FIG. 3) and the upper adhesive layer 312 (shown in FIG. 3) may be deposited onto the upper centering layer 308 (shown in FIG. 3). The adhesive layers 310, 312 may be formed by depositing an epoxy, a low stress epoxy, a thermoplastic, a high temperature thermoplastic, or a high lateral flow ceramic filled hydrocarbon material. Alternatively, a different material may be used. The adhesive layers 310, 312 may bond to the lower and upper centering layers 306, 308 and cure to form rigid or semi-rigid layers that laterally support the substrate 104 (shown in FIG. 1).

In one embodiment, the adhesive layers 310, 312 (shown in FIG. 3) may be provided by depositing the adhesive layers 310, 312 and then planarizing one or more of the adhesive layers 310, 312. For example, the adhesive layers 310, 312 may be deposited in such a manner that outer surfaces of the adhesive layers 310, 312 are three-dimensional or non-planar surfaces. The outer surfaces of the adhesive layers 310, 312 may be converted into two-dimensional or planar surfaces by removing portions of the adhesive layers 310, 312.

Figure 10:
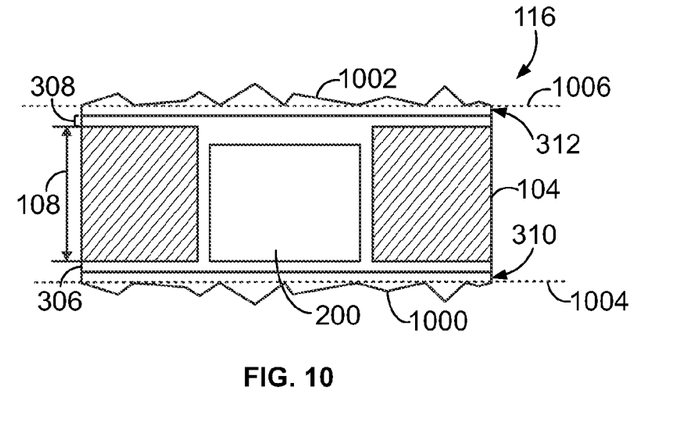
FIG. 10 is a cross-sectional view of one embodiment of the electronic device shown in FIG. 1 after providing adhesive layers on the substrate shown in FIG. 1.

FIG. 10 is a cross-sectional view of one embodiment of the electronic device 116 after providing the adhesive layers 310, 312. As shown in FIG. 10, the adhesive layers 310, 312 can be deposited onto the lower and upper centering layers 306, 308. Outer surfaces 1000, 1002 of the adhesive layers 310, 312 may be three-dimensional or non-planar surfaces. For example, the outer surfaces 1000, 1002 may be rough or undulating surfaces. Portions of the adhesive layers 310, 312 may be removed in order to form more planar or two dimensional outer surfaces 1000, 1002. In the illustrated embodiment, the portions of the upper adhesive layer 312 that extend above an upper plane 1006 may be removed to planarize the upper adhesive layer 312. The portions of the lower adhesive layer 310 that extend below a lower plane 1004 may be removed to planarize the lower adhesive layer 310. The adhesive layers 310, 312 can have two-dimensional or planar outer surfaces 1000, 1002 when the portions of the adhesive layers 310, 312 that are above or below the planes 1004, 1006, respectively, are removed.

The adhesive layers 310, 312 can be planaraized by sanding, cutting, or other mechanical removal of the portions of the adhesive layers 310, 312 that are above or below the planes 1004, 1006. The planarizing of the adhesive layers 310, 312 can damage the ferrite material body 200 if the ferrite material body 200 projects out of the substrate 104 or is disposed too close to the adhesive layers 310, 312. As described above, the lower and upper centering layers 306, 308 can keep the ferrite material body 200 within the thickness dimension 108 of the substrate 104 such that the ferrite material body 200 is held far enough away from the adhesive layers 310, 312 that the ferrite material body 200 is not damaged when the adhesive layers 310, 312 are planarized.

Returning to the discussion of the method 400 shown in FIG. 4, at 414, vias are formed through the substrate. For example, the vias 114 (shown in FIG. 1) may be cut, drilled, or otherwise formed through the substrate 104 (shown in FIG. 1), the centering layers 306, 308 (shown in FIG. 3), and the adhesive layers 310, 312 (shown in FIG. 3). The vias 114 are filled or plated with conductive material to provide conductive pathways through the thickness dimension 108 (shown in FIG. 1) of the substrate 104. The vias 114 may be provided on opposite sides of the ferrite material body 200, as shown in FIG. 2.

At 416, top and bottom conductors are provided above and below the adhesive layers. The top and bottom conductors are conductively coupled with the vias on opposite sides of the ferrite material body to form conductive loops around the ferrite material body. For example, one or more layers of a metal or metal alloy, such as copper, can be deposited on the upper adhesive layer 312 (shown in FIG. 3) and on the lower adhesive layer 310 (shown in FIG. 3) to form the top conductors 106 (shown in FIG. 1) and the bottom conductors 314 (shown in FIG. 3). The top and bottom conductors 106, 314 are conductively coupled with the vias 114 to form the conductive loops 206, 208 (shown in FIG. 2) around the ferrite material body 200, as shown in FIG. 3.

At 418, mask layers are provided on the top and/or bottom conductors. For example, the mask layers 316, 318 (shown in FIG. 3) may be deposited on portions of the top and/or bottom conductors 106, 314 (shown in FIGS. 1 and 3). Solder may then be applied to the portions of the top and/or bottom conductors 106, 314 that are not covered by the mask layers 316 or 318. The solder on the top and/or bottom conductors 106, 314 may then be used to conductively couple the top and/or bottom conductors 106, 314 to other electronic components, such as the first and/or second circuits 202, 204 (shown in FIG. 2).

As described above, the method 400 may be utilized to manufacture a planar electronic device 116 (shown in FIG. 1) having a ferrite material body 200 (shown in FIG. 2) as the core of the magnetic component 102 (shown in FIG. 1) in the electronic device 116. The ferrite material body 200 is confined within the thickness dimension 108 (shown in FIG. 1) of a substrate 104 (shown in FIG. 1) of the electronic device 116 by lower and/or upper centering layers 306, 308 (shown in FIG. 3). The ferrite material body 200 is held within the substrate 104 so that the ferrite material body 200 is not damaged by subsequent processing operations. For example, positioning the ferrite material body 200 within the substrate 104 such that the ferrite material body 200 does not protrude from either side 110, 112 (shown in FIG. 1) of the substrate 104 can prevent shaving or sanding of the ferrite material body 200 during a planarization process, mechanical stress on the ferrite material body 200 that can be caused by deposition of one or more of the adhesive layers 310, 312 (shown in FIG. 3) onto the ferrite material body 200, and/or damage to the ferrite material body 200 that is caused during reflow of solder during subsequent processing steps when the ferrite material body 200 is disposed too close to the mask layers 316, 318 (shown in FIG. 3).

In another embodiment, the lower centering layer 306 (shown in FIG. 3) may be a layer formed from a composite material. For example, the lower centering layer 306 may be a fiber-reinforced polymer sheet that is adhered to the lower side 110 (shown in FIG. 1) of the substrate 104 (shown in FIG. 1). The fiber-reinforced polymer sheet can provide additional lateral stability or support to the substrate 104 while also assisting in centering or locating the ferrite material bodies 200 (shown in FIG. 2) inside the holes 300 (shown in FIG. 3) of the substrate 104. With respect to the method 400 shown in FIG. 4, the fiber-reinforced polymer sheet may be provided at 404 as the lower centering layer.

Figure 11:
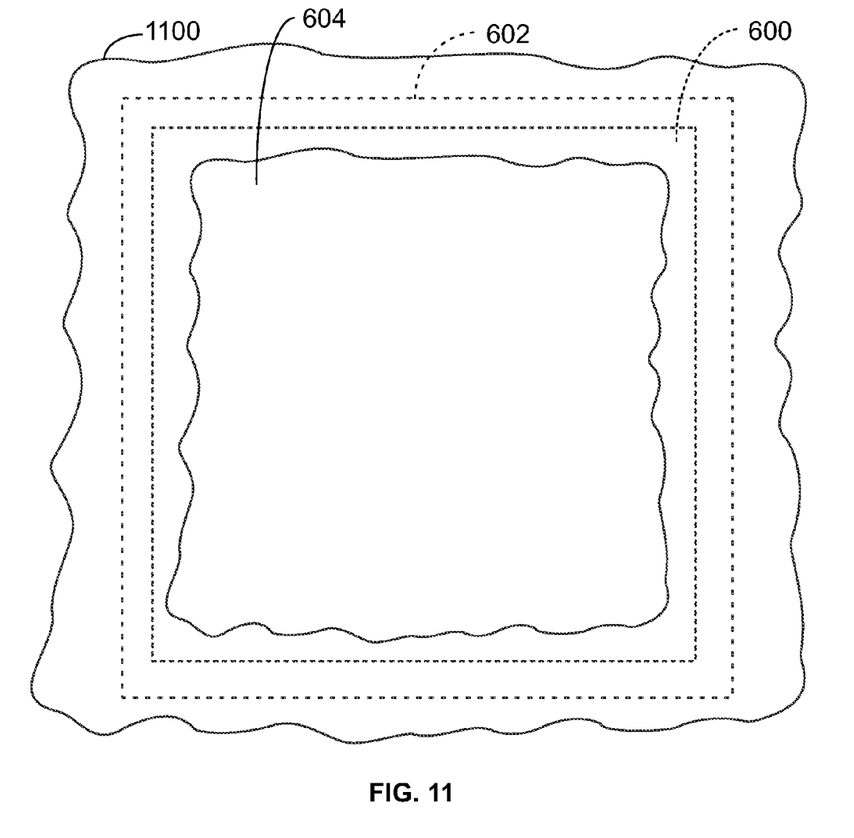
FIG. 11 is a top view of the transfer board shown in FIG. 6 with a fiber sheet disposed on the transfer board.

FIG. 11 is a top view of the transfer board 600 with the supporting surface 602 and a fiber sheet 1100 disposed on the transfer board 600. The fiber sheet 1100 includes several overlapping or woven strands or filars. For example, the fiber sheet 1100 may be a fiberglass sheet formed from elongated glass fibers that are woven together to form the fiber sheet 1100. Alternatively, another type of fiber sheet may be used. In order to create a lower centering layer 1200 (shown in FIG. 12) that includes the fiber sheet 1100, the fluid base 604 of the non-conductive material from which the lower centering layer 1200 is formed is deposited or applied to the fiber sheet 1100. For example, liquid epoxy that includes or is mixed with a hardening agent may be deposited onto the fiber sheet 1100 such as by brushing, pouring, wiping, or otherwise placing the liquid epoxy onto the fiber sheet 1100. The fluid base 604 permeates through the fiber sheet 1100 such that the fluid base 604 may be disposed below the fiber sheet 1100 (e.g., between the fiber sheet 1100 and the supporting surface 602), above the fiber sheet 1100, and within the fiber sheet 1100 between the strands, fibers, or filars that form the fiber sheet 1100. Alternatively, the fluid base 604 may be applied to the supporting surface 602 and the fiber sheet 1100 may be laid on the fluid base 604 and an additional fluid base 604 may be applied onto the fiber sheet 1100.

The substrate 104 (shown in FIG. 1) is placed onto the fluid base 604 and the fiber sheet 1100 such that the lower side 110 (shown in FIG. 1) of the substrate 104 contacts the fluid base 604 and/or the fiber sheet 1100. At least some of the fluid base 604 can be transferred onto the lower side 110 of the substrate 104. In one embodiment, a mass or weight is placed on the upper side 112 (shown in FIG. 1) of the substrate 104 to provide a force on the substrate 104. The substrate 104 may be left on the fluid base 604 for a sufficiently long time to permit the fluid base 604 to cure and form a composite fiber-reinforced polymer sheet as the lower centering layer 1200 (shown in FIG. 12). Once the fiber-reinforced lower centering layer 1200 is cured, the substrate 104 and the fiber-reinforced lower centering layer 1200 may be removed from the supporting surface 602.

Figure 12:
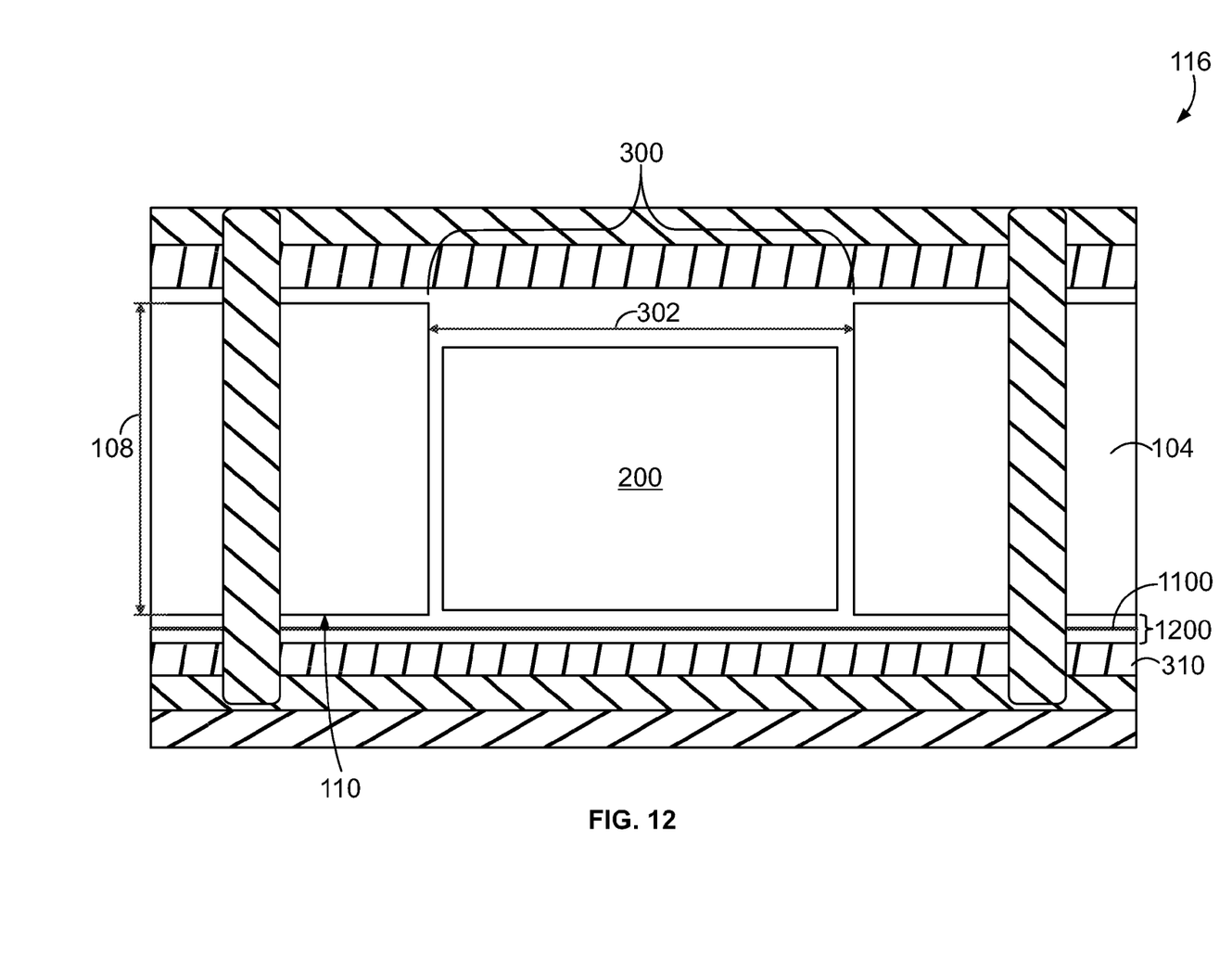
FIG. 12 is a cross-sectional view of the planar electronic device shown in FIG. 1 that includes a fiber-reinforced lower centering layer in accordance with one embodiment.

FIG. 12 is a cross-sectional view of the planar electronic device 116 that includes the fiber-reinforced lower centering layer 1200 in accordance with one embodiment. As shown in FIG. 12, the lower centering layer 1200 is disposed between the lower side 110 of the substrate 104 and the lower adhesive layer 310. The fiber sheet 1100 is disposed within the lower centering layer 1200 and provides additional support and/or stability to the electronic device 116. While the fiber sheet 1100 is generally disposed near the center of the lower centering layer 1200, alternatively, the fiber sheet 1100 may be disposed closer to the substrate 104 or the lower adhesive layer 310. For example, the fiber sheet 1100 may be located at the interface between the lower centering layer 1200 and the substrate 104 or at the interface between the lower centering layer 1200 and the lower adhesive 310.

As described above, the holes 300 in the substrate 104 in which the ferrite material bodies 200 are located may be formed as through holes or bore holes that have a constant diameter dimension 302 throughout the thickness dimension 108 of the substrate 104. The constant diameter dimensions 302 of the holes 300 can allow for the holes 300 to be drilled or cut through several substrates 104 at the same time. For example, several substrates 104 without the holes 300 can be stacked on top of one another and a drill or other device can punch several holes 300 through several substrates 104 at the same time.

Figure 13:
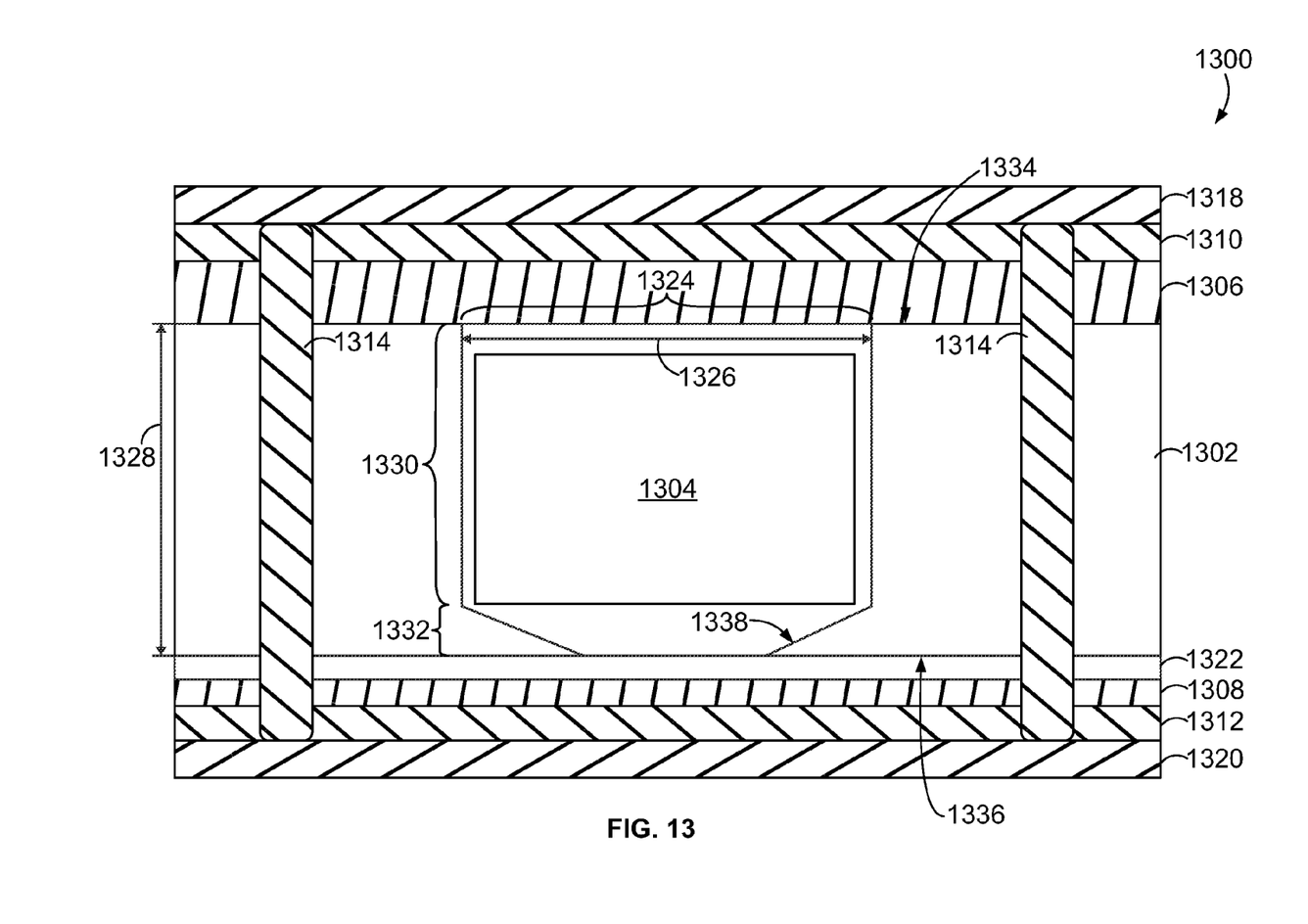
FIG. 13 is a cross-sectional view of another embodiment of a planar electronic device.

FIG. 13 is a cross-sectional view of another embodiment of a planar electronic device 1300. The planar electronic device 1300 may be similar to the planar electronic device 116 (shown in FIG. 1). For example, the planar electronic device 1300 may include a planar substrate 1302 with one or more ferrite material bodies 1304 disposed within holes 1324 in the substrate 1302 and adhesive layers 1306, 1308 disposed on opposite sides of the substrate 1302. The electronic device 1300 also includes top and bottom conductors 1310, 1312 located outside of the adhesive layers 1306, 1308 and conductive vias 1314 that extend through the substrate 1302 to conductively couple the top and bottom conductors 1310, 1312 and form a conductive loop around the ferrite material body 1304. Solder masks 1318, 1320 are deposited onto portions of the top and bottom conductors 1310, 1312, similar to as described above in connection with the mask layers 316, 318 (shown in FIG. 3).

In the illustrated embodiment, the electronic device 1300 includes a lower centering layer 1322 that can be similar to the lower centering layer 306 (shown in FIG. 3) and/or the lower centering layer 1200 (shown in FIG. 12). The electronic device 1300 does not include an upper centering layer, but may alternatively include an upper centering layer that is similar to the upper centering layer 308 (shown in FIG. 3).

One difference between the electronic device 1300 and the electronic device 116 shown in FIG. 1 is the shape of the holes 1324. For example, the holes 300 (shown in FIG. 3) in the electronic device 116 are shown as through holes having constant diameter dimensions 302 (shown in FIG. 3). The holes 1324 in the electronic device 1300 have a diameter dimension 1326 that changes or is different at two or more locations within a thickness dimension 1328 of the substrate 1302. In the illustrated embodiment, the hole 1324 has two stages 1330, 1332 each having a different diameter dimension 1326. While only two stages 1330, 1332 are shown in FIG. 13, alternatively, a greater number of stages 1330, 1332 may be provided. As shown in FIG. 13, the stages 1330, 1332 provide a ledge structure that can be circular or semi-circular in shape and that holds the ferrite material body 1304 in place within the substrate 1302. The stages 1330, 1332 can be formed using controlled depth route drilling machines, lasers, or other drilling equipment, for example.

The stage 1330 may be referred to as an insertion stage 1330 and extends from an upper side 1334 of the substrate 1302 toward an opposite lower side 1336 of the substrate 1302. The insertion stage 1330 is defined by a constant diameter dimension 1326. The stage 1332 may be referred to as a centering stage 1332 and extends from the insertion stage 1330 to the lower side 1336 of the substrate 1302. In the illustrated embodiment, the stages 1330, 1332 are successive and connected to each other. Alternatively, one or more additional stages may be located between the stages 1330, 1332.

The diameter dimension 1326 of the insertion stage 1330 is larger than the diameter dimension 1326 of the centering stage 1332. As shown in FIG. 13, an inner surface 1338 of the substrate 1302 in the hole 1324 is tapered or angled such that the diameter dimension 1326 decreases as the centering stage 1332 extends from the insertion stage 1330 to the lower side 1336 of the substrate 1302. For example, the inner surface 1338 in the centering stage 1332 may be obliquely angled relative to the inner surface 1338 in the insertion stage 1330 so that the diameter dimension 1326 decreases as the hole 1324 extends from the insertion stage 1330 to the lower side 110 of the substrate 104.

The ferrite material body 1304 can be loaded into the hole 1324 through the insertion stage 1330 and partly into the centering stage 1332. At some position within the centering stage 1332 the tapered or angled inner surface 1338 reduces the diameter dimension 1326 to a size that is smaller than the ferrite material body 1304. At this position, the diameter dimension 1326 within the centering stage 1332 is smaller than one or more dimensions of the ferrite material body 1304 such that the inner surface 1338 of the substrate 1302 prevents the ferrite material body 1304 from exiting or protruding from the hole 1324 through the lower side 1336 of the substrate 1302. The inner surface 1338 of the substrate 1302 in the centering stage 1332 forms a lip or flange that blocks passage of the ferrite material body 1304 through the lower side 1336 of the substrate 1302. The inner surface 1338 in the centering stage 1332 may serve alone or in combination with the lower centering layer 1322 to position the ferrite material body 1304 inside the thickness dimension 1328 of the substrate 1302.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to one of ordinary skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable a person of ordinary skill in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for manufacturing a planar electronic device, the method comprising:
    applying a non-conductive fluid polymer to a lower side of a planar substrate, the substrate including a hole extending through the substrate between the lower side and an opposite upper side of the substrate;
    curing the fluid polymer to form a solid centering layer on the lower side of the substrate, the centering layer extending across the hole along the lower side of the substrate;
    loading a ferrite material body into the hole of the substrate through the upper side of the substrate such that the ferrite material body contacts the centering layer, the centering layer preventing the ferrite material body from moving beyond the lower side of the substrate;
    embedding the ferrite material body in an encapsulating material that is deposited into the hole and around the ferrite material body; and
    forming one or more conductive loops around the ferrite material body, wherein the ferrite material body is held within the substrate between the lower side and the upper side of the substrate by the encapsulating material.

2. The method of claim 1, wherein planes defined by the upper side and the lower side of the substrate are boundaries of an envelope for receiving the ferrite material body and the ferrite material body is disposed within the envelope.

3. The method of claim 2, wherein the ferrite material body does not intersect the plane defined by the lower side of the substrate.

4. The method of claim 2, wherein the ferrite material body does not intersect the plane defined by the upper side of the substrate.

5. The method of claim 1, further comprising applying the fluid polymer to the upper side of the substrate and across the hole along the upper side of the substrate, the fluid polymer on the upper side curing to form an upper centering layer.

6. The method of claim 1, wherein applying the fluid polymer to the lower side of the substrate includes applying the fluid polymer to a supporting surface of a transfer board that is separate from the substrate, transferring the fluid polymer on the supporting surface to the lower side of the substrate, and removing the substrate and the solid centering layer from the supporting surface.

7. The method of claim 1, wherein applying the fluid polymer to the lower side of the substrate includes providing a fiber sheet within the fluid polymer and curing the fluid polymer includes curing the fiber sheet within the fluid polymer to form a fiber-reinforced layer as the centering layer.

8. The method of claim 1, further comprising forming the hole in the substrate such that the hole has different diameter dimensions in different locations within the substrate between the upper side of the substrate and the lower side of the substrate, the different diameter dimensions formed by an angled inner surface of the substrate that tapers the different diameter dimensions.

9. A method for manufacturing a planar electronic device, the method comprising:
applying a non-conductive fluid polymer to a lower side of a planar substrate, the substrate including a hole extending through the substrate between the lower side and an opposite upper side of the substrate;
curing the fluid polymer to form a solid centering layer on the lower side of the substrate, the centering layer extending across the hole along the lower side of the substrate;
loading a ferrite material body into the hole of the substrate through the upper side of the substrate, the centering layer preventing the ferrite material body from moving beyond the lower side of the substrate;
embedding the ferrite material body in an encapsulating material that is deposited into the hole and around the ferrite material body; and
forming one or more conductive loops around the ferrite material body, wherein the ferrite material body is held within the substrate between the lower side and the upper side of the substrate by the encapsulating material,
wherein applying the fluid polymer to the lower side of the substrate includes applying the fluid polymer to a supporting surface of a transfer board that is separate from the substrate, transferring the fluid polymer on the supporting surface to the lower side of the substrate, and removing the substrate and the solid centering layer from the supporting surface.

10. The method of claim 9, wherein planes defined by the upper side and the lower side of the substrate are boundaries of an envelope for receiving the ferrite material body and the ferrite material body is disposed within the envelope.

11. The method of claim 10, wherein the ferrite material body does not intersect one or more of the plane defined by the lower side of the substrate or the plane defined by the upper side of the substrate.

12. The method of claim 9, further comprising applying the fluid polymer to the upper side of the substrate and across the hole along the upper side of the substrate, the fluid polymer on the upper side curing to form an upper centering layer.

13. The method of claim 9, wherein applying the fluid polymer to the lower side of the substrate includes providing a fiber sheet within the fluid polymer and curing the fluid polymer includes curing the fiber sheet within the fluid polymer to form a fiber-reinforced layer as the centering layer.

14. The method of claim 9, further comprising forming the hole in the substrate such that the hole has different diameter dimensions in different locations within the substrate between the upper side of the substrate and the lower side of the substrate, the different diameter dimensions formed by an angled inner surface of the substrate that tapers the different diameter dimensions.

15. A method for manufacturing a planar electronic device, the method comprising:
forming a hole in a planar substrate such that the hole has different diameter dimensions in different locations within the substrate between an upper side of the substrate and an opposite lower side of the substrate, the different diameter dimensions formed by an angled inner surface of the substrate that tapers the different diameter dimensions;
applying a non-conductive fluid polymer to the lower side of the substrate, the substrate including the hole extending through the substrate between the lower side and the upper side of the substrate;
curing the fluid polymer to form a solid centering layer on the lower side of the substrate, the centering layer extending across the hole along the lower side of the substrate;
loading a ferrite material body into the hole of the substrate through the upper side of the substrate, the centering layer preventing the ferrite material body from moving beyond the lower side of the substrate;
embedding the ferrite material body in an encapsulating material that is deposited into the hole and around the ferrite material body; and
forming one or more conductive loops around the ferrite material body, wherein the ferrite material body is held within the substrate between the lower side and the upper side of the substrate by the encapsulating material.

16. The method of claim 15, wherein planes defined by the upper side and the lower side of the substrate are boundaries of an envelope for receiving the ferrite material body and the ferrite material body is disposed within the envelope, wherein the ferrite material body does not intersect one or more of the plane defined by the lower side of the substrate or the plane defined by the upper side of the substrate.

17. The method of claim 15, further comprising applying the fluid polymer to the upper side of the substrate and across the hole along the upper side of the substrate, the fluid polymer on the upper side curing to form an upper centering layer.

18. The method of claim 15, wherein applying the fluid polymer to the lower side of the substrate includes applying the fluid polymer to a supporting surface of a transfer board that is separate from the substrate, transferring the fluid polymer on the supporting surface to the lower side of the substrate, and removing the substrate and the solid centering layer from the supporting surface.

19. The method of claim 15, wherein applying the fluid polymer to the lower side of the substrate includes providing a fiber sheet within the fluid polymer and curing the fluid polymer includes curing the fiber sheet within the fluid polymer to form a fiber-reinforced layer as the centering layer.

* * * * *